(12) United States Patent
Hou

(10) Patent No.: US 11,976,750 B2
(45) Date of Patent: May 7, 2024

(54) RESIN MATERIAL FOR HOSE AND HOSE

(71) Applicant: THE YOKOHAMA RUBBER CO., LTD., Tokyo (JP)

(72) Inventor: Gang Hou, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 122 days.

(21) Appl. No.: 17/554,151

(22) Filed: Dec. 17, 2021

(65) Prior Publication Data

US 2022/0213989 A1 Jul. 7, 2022

(30) Foreign Application Priority Data

Jan. 6, 2021 (JP) .................................. 2021-000859

(51) Int. Cl.
*F16L 11/08* (2006.01)
*B60H 1/00* (2006.01)
*F16L 11/12* (2006.01)

(52) U.S. Cl.
CPC ........ *F16L 11/086* (2013.01); *B60H 1/00571* (2013.01); *F16L 11/12* (2013.01)

(58) Field of Classification Search
CPC ...... F16L 11/086; F16L 11/12; B60H 1/00571
See application file for complete search history.

(56) References Cited

U.S. PATENT DOCUMENTS

| | | | |
|---|---|---|---|
| 2003/0109623 A1 | 6/2003 | Gornowicz et al. | |
| 2005/0011571 A1* | 1/2005 | Wilson | B32B 27/34 138/125 |
| 2009/0211660 A1* | 8/2009 | Johnson | F16L 11/086 138/146 |
| 2011/0014478 A1* | 1/2011 | Sagisaka | B32B 27/285 428/421 |
| 2011/0186170 A1* | 8/2011 | Oishi | B32B 27/34 138/140 |
| 2012/0073696 A1 | 3/2012 | Terada et al. | |
| 2013/0053494 A1 | 2/2013 | Mori | |

(Continued)

FOREIGN PATENT DOCUMENTS

| | | |
|---|---|---|
| CN | 1568351 A | 1/2005 |
| CN | 103097794 A | 5/2013 |

(Continued)

*Primary Examiner* — David R Deal

(74) *Attorney, Agent, or Firm* — Carrier, Shende & Associates P.C.; Joseph P. Carrier; Fulchand P. Shende

(57) ABSTRACT

A resin material, in which the elongation at break in an environmental condition at a predetermined temperature of 100° C. or higher and 150° C. or lower is 50% or more, a content of a plasticizer is 3 mass % or less with respect to the total mass of the resin material, a strength at break in the environmental condition at this predetermined temperature is 5 MPa or more, the elongation at break is 500% or less, and a 10% modulus is 3 MPa or less, is formed into a tubular form and used as an inner surface layer, an intermediate layer, and an outer surface layer of a hose, and components of an air conditioner are connected through the hose. Such resin material, and also a hose including the resin material, which are mainly used for an air conditioner installed in a vehicle, have improved durability in a high temperature environment.

11 Claims, 5 Drawing Sheets

(56) References Cited

U.S. PATENT DOCUMENTS

2013/0216751 A1* 8/2013 Mizutani ................. B29C 48/09
 428/36.9
2019/0010317 A1* 1/2019 Muco ..................... H01B 3/441
2021/0199216 A1* 7/2021 Hisanaga .............. F16L 11/086
2022/0213989 A1* 7/2022 Hou ................... B60H 1/00571

FOREIGN PATENT DOCUMENTS

CN 103842424 A 6/2014
JP 2013-155793 A 8/2013

* cited by examiner

RESIN MATERIAL FOR HOSE AND HOSE

TECHNICAL FIELD

The present invention relates to a resin material for a hose and a hose, and particularly relates to a resin material mainly used in a hose for an air conditioner installed in a vehicle and the hose itself.

BACKGROUND ART

In an air conditioner installed in a vehicle such as an automobile, a circulation path that circulates a refrigerant is formed. This circulation path is formed by connecting components such as a compressor, a condenser, a separation dryer (receiver dryer), and an evaporator through hoses.

The hose is required to have pressure resistance that can withstand internal pressure caused by the refrigerant flowing therethrough, and thus a metal pipe and a rubber hose are widely used. In recent years, there has been demand for reducing vehicle weight from the perspective of reducing environmental impact, improving energy efficiency, and the like.

Various resin hoses have been proposed as a hose for an air conditioner in an automobile (a hose for an air conditioner) (e.g., see Patent Document 1). Such resin hoses are advantageous in weight reduction compared to metal pipes and rubber hoses. However, such a hose is used in an environment that is at a high temperature for a long term. In recent years, it is often required for a hose to have durability in a high temperature environment at 100° C. or higher, and there is room for improvement in durability of the hose in a high temperature environment.

CITATION LIST

Patent Literature

Patent Document 1: JP 2013-155793 A

SUMMARY OF INVENTION

Technical Problem

An object of the present invention is to provide a resin material for a hose that is mainly used in a hose for an air conditioner installed in a vehicle and that has improved durability in a high temperature environment, and the hose itself.

Solution to Problem

The resin material for a hose according to an embodiment of the present invention to achieve the object described above has an elongation at break in an environmental condition at a predetermined temperature of 100° C. or higher and 150° C. or lower of 50% or more, and a content of a plasticizer of 3 mass % or less with respect to a total mass.

The hose according to an embodiment of the present invention is formed by forming the resin material for a hose described above into a tubular form and is used as a constituent member of a hose.

Advantageous Effects of Invention

The resin material for a hose according to an embodiment of the present invention has an elongation at break of 50% or more in an environmental condition at a predetermined temperature of 100° C. or higher and 150° C. or lower. Therefore, even when the use condition of the hose is in a high temperature environment of 100° C. or higher, durability that can withstand practical use can be ensured. Furthermore, the content of the plasticizer with respect to the total mass of the resin material is extremely small or no plasticizer is contained. Since the plasticizer gradually disappears from the resin material over time, when the content is higher, change over time of physical properties of the resin material becomes more significant. Because the resin material for a hose according to an embodiment of the present invention contains substantially no plasticizer, the change over time of the physical properties is suppressed, and it is advantageous to maintain durability in a high temperature environment for a long term.

According to the hose of an embodiment of the present invention, change over time of the physical properties of a constituent member of a hose is suppressed even in a use condition at a high temperature, and thus excellent durability can be maintained over a long term.

DESCRIPTION OF EMBODIMENTS

A resin material for a hose and a hose according to embodiments of the present invention will be described below with reference to the drawings.

Figure 1:
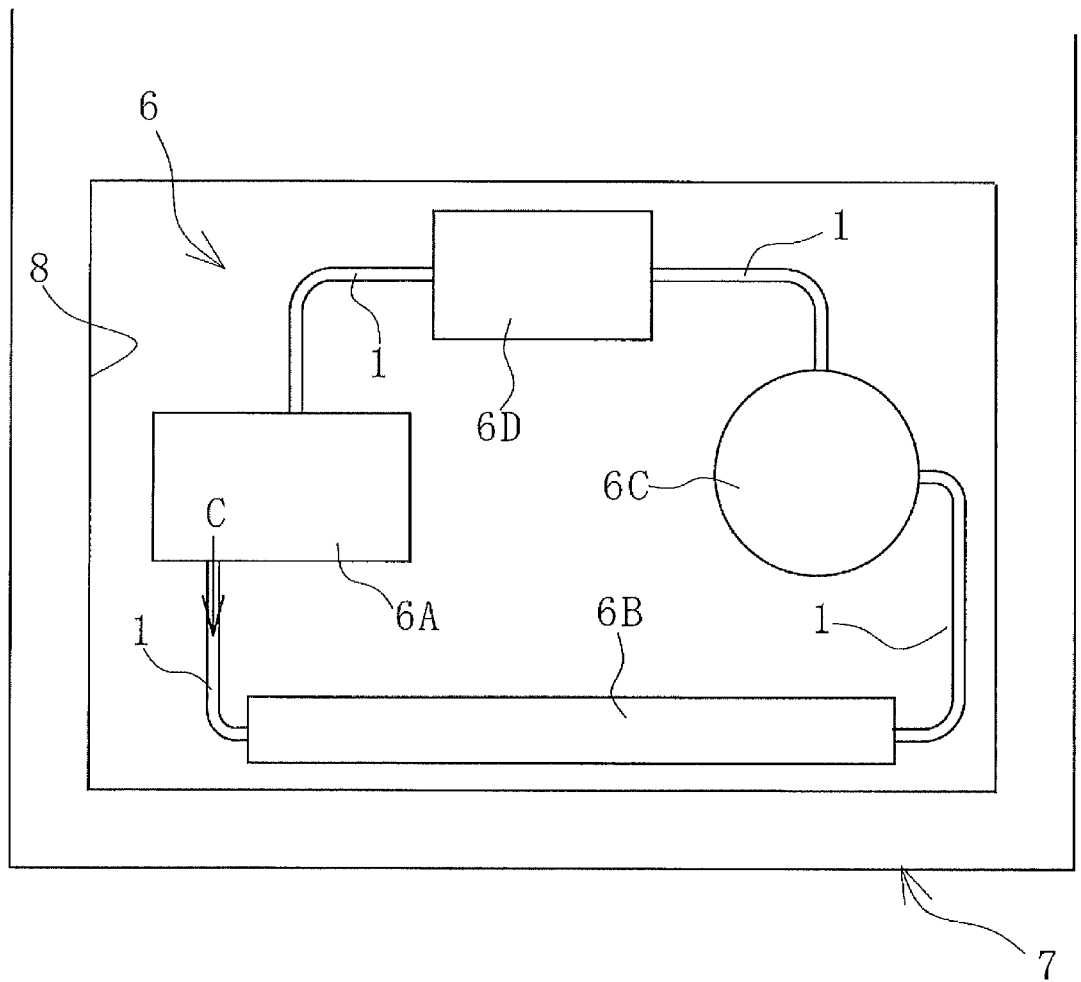
FIG. 1 is an explanatory diagram schematically illustrating an air conditioner provided with a hose according to an embodiment of the present invention in a plan view.

A hose 1 according to an embodiment of the present invention illustrated in FIG. 1 is used in an air conditioner 6 (hereinafter, referred to as air conditioner 6) installed in an automobile 7. The hose 1 can be used, not limited to the automobile 7, in the air conditioner 6 installed in other types of vehicles, such as heavy construction vehicles and agricultural vehicles. The inner diameter of the hose 1 is, for example, 2.0 mm or more and 52.0 mm or less.

The air conditioner 6 is arranged in an engine compartment 8 which reaches a high temperature. The components 6A, 6B, 6C, and 6D of the air conditioner 6 are connected through the hose 1, and thus a circulation path to circulate a refrigerant C is formed. Examples of the components 6A to 6D include a compressor, a condenser, a separation dryer, an expansion valve, and an evaporator. The air conditioner 6 includes another component as necessary. Examples of the refrigerant C include HFC-134a and HFO-1234y.

Figure 2:
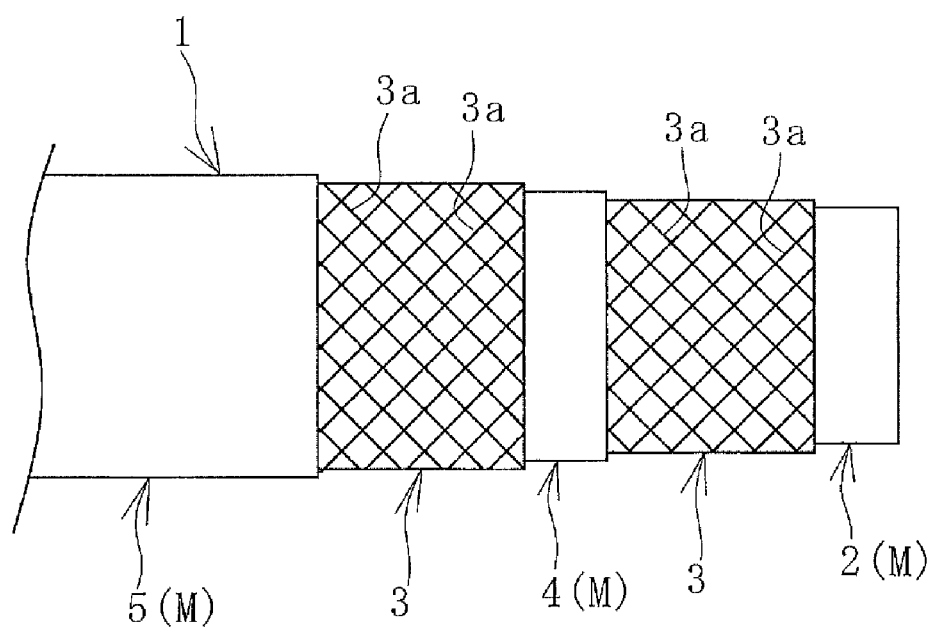
FIG. 2 is an explanatory diagram illustrating a partially cutout hose in FIG. 1.
Figure 3:
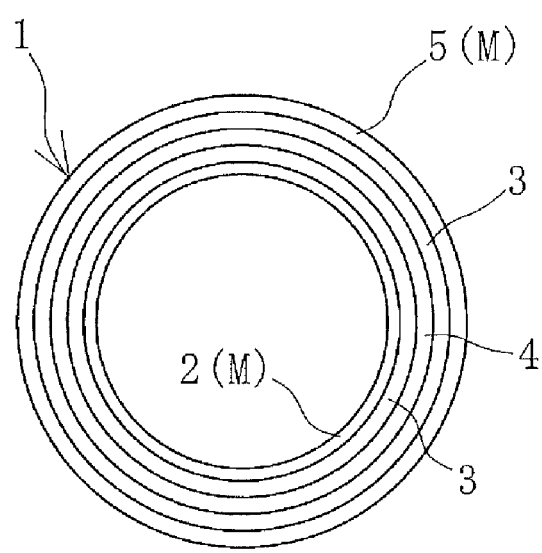
FIG. 3 is a transverse cross-sectional view of the hose in FIG. 2.

In the hose 1 as illustrated in FIG. 2 and FIG. 3, a hose wall surface is formed by a resin material M for a hose according to an embodiment of the present invention (hereinafter, referred to as resin material M). That is, a cylindrical body formed by forming this resin material M into a tubular form is the constituent member of the hose 1. In detail, an inner surface layer 2, an intermediate layer 4, and an outer surface layer 5 of the hose 1 are formed by the resin material M. The intermediate layer 4 is not necessary and can be optionally provided.

The resin material M contains a resin component or contains a resin component and a small amount of plasticizer. Note that the resin component is not limited to a case where the entirety thereof is a resin but also includes a case where a part thereof is an elastomer or a rubber. Furthermore, for the resin component, a case where only one type of resin is employed and a case where a plurality of types of resins are blended are possible. In addition to the resin material M, for example, a flame retardant, an anti-aging agent, and a coloring agent can be blended in a range that does not reduce the elongation at break of 50% in an environmental condition at a predetermined temperature T described below.

The content of the plasticizer is 3 mass % or less, preferably 2 mass % or less, and even more preferably 1 mass % or less or 0 mass %, with respect to the total mass of the resin material M. That is, the resin material M contains substantially no plasticizer. A minimum amount of plasticizer that is necessary to ensure plasticity required for injection and extrusion of the resin material M can be blended.

The inner surface layer 2 is a part where a liquid to be flowed is in direct contact and is an innermost circumferential layer of the hose 1. The outer surface layer 5 is a part exposed outside and is an outermost circumferential layer of the hose 1. The intermediate layer 4 is interposed between the inner surface layer 2 and the outer surface layer 5. That is, the inner surface layer 2, the intermediate layer 4, and the outer surface layer 5 are layered coaxially in this order from the inner circumferential side.

This hose 1 further has reinforcing layers 3 interposed between the inner surface layer 2 and the intermediate layer 4 and between the intermediate layer 4 and the outer surface layer 5. In this embodiment, a reinforcing layer 3 having a braid structure, in which reinforcing wires 3a are braided, is employed; however, a reinforcing layer 3 having a helical structure, in which reinforcing wires 3a are wound helically, can be also employed. Examples of the reinforcing wire 3a include non-metal wires formed from resin fibers or natural fibers, such as polyester, nylon, polyurethane, acryl, polyvinyl chloride, rayon, cupra, polynosic, cotton, and aramid, and metal wires such as steel and steel wires. The specification and disposal density of the reinforcing layer 3 are selected mainly based on internal pressure resistance required for the hose 1. In the hose 1, adjacent layers are bonded together and integrated.

This resin material M has the elongation at break in an environmental condition of 50% or more at a predetermined temperature T of 100° C. or higher and 150° C. or lower. The predetermined temperature T is preferably varied based on a portion of the hose in which the resin material M is used, and, for example, is 100° C. and more preferably 120° C., for the inner surface layer 2, and is 135° C. and more preferably 150° C., for the outer surface layer 5. When the hose internal pressure (internal pressure in operation) is 3.9 MPa or more, the inner surface layer 2 and the outer surface layer 5 are preferably formed from resin materials M having different specifications. Note that this predetermined temperature T for the intermediate layer 4 is set to the temperature identical to that of the inner surface layer 2 but may be set to the temperature identical to that of the outer surface layer 5 depending on the use condition of the hose 1.

In a case where the predetermined temperatures T are not varied based on portions of the hose, such as a case where the hose internal pressure (internal pressure in operation) is less than 3.9 MPa, the predetermined temperature T is set to, for example, 135° C., and more preferably 150° C. That is, in the case where the inner surface layer 2 and the outer surface layer 5 are formed form the resin materials M having the same specification, the predetermined temperature T is preferably set to 135° C. or 150° C.

When this elongation at break is less than 50%, adequate durability as the hose 1 cannot be ensured, and the elongation at break is more preferably set to 100% or more. Because making this elongation at break higher than needed only results in being overdesigned, the upper limit of this elongation at break is 500%, and more preferably 300%. This elongation at break is a value measured in accordance with the method specified in JIS K 6251:2017. In detail, this elongation at break is an elongation at the time when a dumbbell No. 6 shaped test piece of the resin material M is stretched at a rate of 50 mm/min and the test piece is cut, and is expressed by a ratio (%) with respect to the test length of the test piece before the test.

To obtain the resin material M having the elongation at break of 50% or more at the predetermined temperature T while substantially no plasticizer is contained, for example, production is preferably performed by blending a thermoplastic resin and an elastomer (or rubber). An alloy material having an islands-in-the-sea structure, in which the thermoplastic resin is the sea and the elastomer (or rubber) is the islands, is preferably used for the resin material M.

For example, alloy materials are produced by varying the blending ratio of the elastomer (or rubber) with respect to the thermoplastic resin in multiple ways to determine the blending ratio of the elastomer (or rubber) of the alloy material that achieves the elongation at break of 50% or more at the predetermined temperature T. Accordingly, the appropriate range of the blending ratio of the elastomer (or rubber) with respect to the thermoplastic resin is determined. Taking other requirements (e.g., strength at break and 10% modulus) described below into consideration within this appropriate range, the blending proportion of the elastomer (or rubber) with respect to the thermoplastic resin is determined. By using such an alloy material having the islands-in-the-sea structure as the resin material M, it becomes easier to provide the elongation at break of the predetermined temperature T of 50% or more and the 10% modulus of 3 MPa or less described below in a compatible manner.

Examples of the thermoplastic resin used in the resin material M include polyamide, polyethylene, polypropylene, polyvinyl chloride, polystyrene, polyvinyl acetate, polyurethane, Teflon (trade name), ABS resins, AS resins, acrylic resins, polyacetal, polycarbonate, modified polyphenylene ether, polyester, polyphenylene sulfide, polytetrafluoroethylene, polysulfone, polyethersulfone, amorphous polyarylate, liquid crystal polymers, polyether ether ketone, polyamide-imide, polyvinyl alcohol, and ethylene-vinyl alcohol copolymers.

Examples of the elastomer used in the resin material M include olefin-based thermoplastic elastomers, styrene-based thermoplastic elastomers, ethylene-unsaturated carboxylate copolymers, polyamide elastomers, polyester elastomers, and modified products of these.

Examples of the rubber used in the resin material M include natural rubbers, styrene-butadiene rubbers, butadiene rubbers, butyl rubbers, ethylene-propylene-diene rubbers, nitrile rubbers, acrylic rubbers, silicone rubbers, fluororubbers, and modified products of these.

Examples of the plasticizer include phthalate, trimellitate, adipate, phosphate, benzoate, epoxidized plant oil, polyhydric alcohol, polyhydric alcohol ester, and butylbenzenesulfonamide.

Representative examples of the blend and blending proportion of the resin material M include 100 parts by mass of brominated butyl rubber with respect to 100 parts by mass of polyamide resin, or 100 parts by mass of acid-modified ethylene-α-olefin copolymer elastomer with respect to 100 parts by mass of ethylene-vinyl alcohol copolymer resin.

Furthermore, the resin material M preferably has the strength at break in the environmental condition at the predetermined temperature T of preferably 5 MPa or more. This is because, when this strength at break is less than 5 MPa, in a case where a force is unexpectedly and/or locally applied to the hose 1, it becomes difficult to adequately cope with this force, and the strength at break is more preferably 8 MPa or more. Because making this strength at break higher than needed only results in being overdesigned, the upper limit of this strength at break is, for example, 20 MPa. This strength at break is a value obtained by dividing the maximum tensile force recorded when the test piece was stretched until break in the elongation at break measurement described above by the cross-sectional area of the test piece before the test.

The resin material M preferably has the 10% modulus in the environmental condition at the predetermined temperature T of preferably 3 MPa or less. When this 10% modulus is more than 3 MPa, flexibility of the hose 1 is insufficient. Furthermore, when this 10% modulus is more than 3 MPa, the vibrational damping effect of the hose 1 against vibration caused by component 6A and the like is impaired.

The hose 1 used in an air conditioner 6 installed in an automobile 7 is often installed and used with elongation of approximately 10%, and thus the appropriate range of the 10% modulus is preferably set as described above. The lower limit of this 10% modulus is, for example, 1 MPa. This 10% modulus is a value obtained by dividing the tensile force at the time when 10% elongation is applied to the test piece described above by the cross-sectional area of the test piece before the test.

The hose 1 may be used in a high temperature environment of 100° C. or higher, the resin material M preferably contains a resin having a melting point of 170° C. or higher and 230° C. or lower, and more preferably 180° C. or higher and 210° C. or lower, and a raw material having the melting point is used as a main component. The resin material M preferably contains a polyamide (e.g., nylon 11, 12).

Because the inner surface layer 2 is brought into direct contact with a refrigerant C, for example, taking durability to the refrigerant C into consideration, an appropriate resin that can achieve the elongation at break in the environmental condition at the predetermined temperature T of 50% or more is employed. For example, an alloy material of a polyamide and a rubber-based material is used. In a configuration in which HFO-1234y is used as the refrigerant C, impermeable properties against the refrigerant C can be improved by using an alloy material of a nylon-based resin and a bromine-based isobutylene-paramethylstyrene copolymer for the inner surface layer 2.

Taking durability, weather resistance, and the like into consideration, an appropriate resin that can achieve the elongation at break in the environmental condition at the predetermined temperature T of 50% or more is employed for the outer surface layer 5. For example, an alloy material of a polyamide and a thermoplastic polyester elastomer (TEEE) is used.

In a resin material containing a plasticizer, the plasticizer is bloomed over time and gradually disappears from the resin material. Along with this, characteristics of the resin material (especially, flexibility and elongation) are changed over time. Because of this, in a case where a hose 1 is formed by using such a resin material, especially for a hose 1 that is used in a high temperature environment, it becomes difficult to ensure excellent durability for a long term. Thus, as the content of the plasticizer with respect to that of the resin material is higher, change over time of physical properties of the resin material becomes more significant.

To avoid the disadvantages described above due to a plasticizer, the resin material M according to an embodiment of the present invention has only a tiny content of a plasticizer or contains no plasticizer. Therefore, with this resin material M, the change over time of physical properties is suppressed, and it is advantageous to maintain the durability for a long term in a high temperature environment. As a result, it becomes possible to maintain the elongation at break in a high temperature environment at the predetermined temperature T of 50% or more for a long term.

Furthermore, because this hose 1 is formed by using the resin material M, the hose 1 can maintain excellent durability for a long term even in a high temperature use condition. Even in an engine compartment 8 with a small space, because the resin material M has the elongation at break in a high temperature environment of the predetermined temperature T of 50% or more, the hose 1 can be appropriately bent to connect components 6A to 6D and can be used for a long term.

Furthermore, because this hose 1 has a low thermal conductivity compared to those of metal pipes or rubber hoses, it is advantageous to suppress increase in the temperature of the engine compartment 8 caused by heat dissipated by the hose 1. Along with this, an effect of reducing the external environment temperature of the hose 1 is achieved.

Most ideally, to maintain excellent durability for a long term, all resin layers constituting the hose 1 (in this embodiment, the inner surface layer 2, the intermediate layer 4, and the outer surface layer 5) are formed by using resin materials M each having, taking the predetermined temperature T as 150° C., an elongation at break in this environmental condition of 50% or more and 500% or less, the strength at break of 5 MPa or more, the 10% modulus of 3 MPa or less, and the content of a plasticizer of zero. Furthermore, the outer surface layer 5 is preferably formed from a resin material M having an elongation at break at the predetermined temperature T (150° C.) larger than that of the inner surface layer 2.

Figure 4:
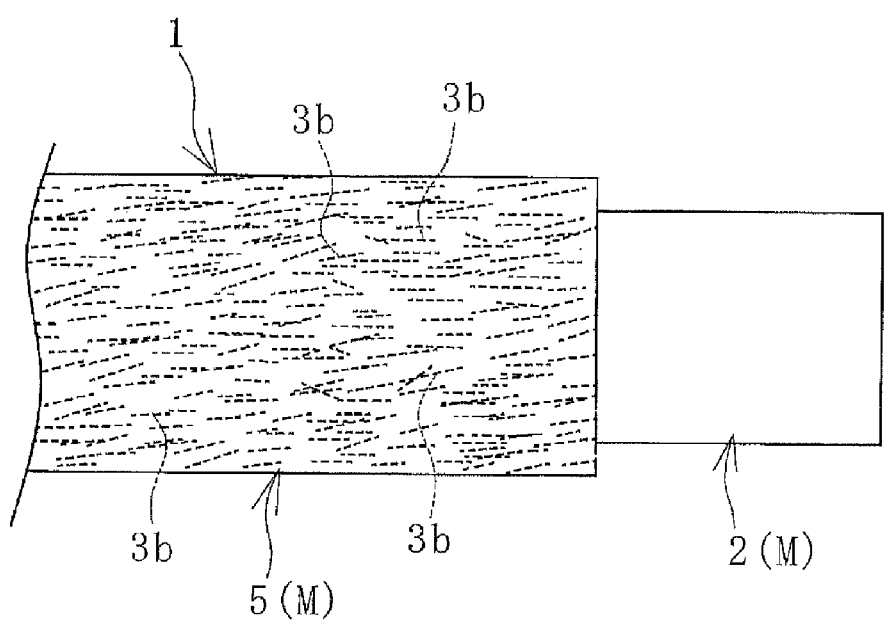
FIG. 4 is an explanatory diagram illustrating a partially cutout hose of another embodiment.
Figure 5:
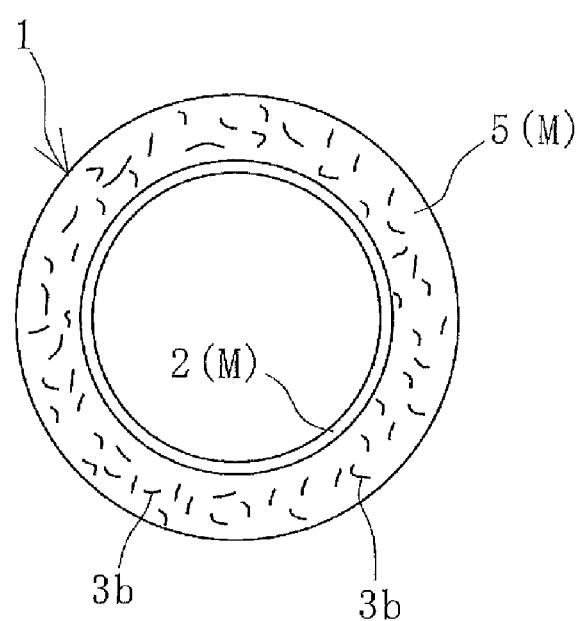
FIG. 5 is a transverse cross-sectional view of the hose in FIG. 4.

A hose 1 of an embodiment illustrated in FIG. 4 and FIG. 5 has an inner surface layer 2 and an outer surface layer 5 that are layered coaxially. The inner surface layer 2 and the outer surface layer 5 are formed by resin materials M. The outer circumferential face of the inner surface layer 2 and the inner circumferential face of the outer surface layer 5 are bonded together and integrated. As described above, the inner surface layer 2 and the outer surface layer 5 preferably use resin materials M that have elongations of 50% or more at predetermined temperatures T that are different each other.

In this hose 1, the reinforcing materials 3b are dispersed and embedded only in the outer surface layer 5. The reinforcing materials 3b are non-metallic short fibers and improve internal pressure resistance of the hose 1. Examples of the reinforcing materials 3b include glass fibers and carbon fibers. The specification of the reinforcing material 3*b* and blending proportion in the outer surface layer 5 are selected mainly based on internal pressure resistance required for the hose 1.

Also for this hose 1, various specifications and modifications described in the embodiments above can be applied.

REFERENCE SIGNS LIST

1 Hose
2 Inner surface layer
3 Reinforcing layer
3*a* Reinforcing wire
3*b* Reinforcing material
4 Intermediate layer
5 Outer surface layer
6 Air conditioner
6A, 6B, 6C, 6D Component
7 Automobile
8 Engine compartment
M Resin material for hose
C Refrigerant

The invention claimed is:

1. A resin material for a hose in which a thermoplastic resin and an elastomer or rubber are blended, having an islands-in-the-sea structure, and in which the thermoplastic resin is the sea and the elastomer or rubber is the islands, and having an elongation at break in an environmental condition at a predetermined temperature of 100° C. or higher and 150° C. or lower of 50% or more, a content of a plasticizer being 3 mass % or less with respect to a total mass.

2. The resin material for a hose according to claim 1, wherein a strength at break in the environmental condition at the predetermined temperature is 5 MPa or more.

3. The resin material for a hose according to claim 1, wherein the elongation at break in the environmental condition at the predetermined temperature is 500% or less.

4. The resin material for a hose according to claim 1, wherein a 10% modulus in the environmental condition at the predetermined temperature is 3 MPa or less.

5. The resin material for a hose according to claim 1, further comprising a resin having a melting point of 170° C. or higher and 230° C. or lower.

6. The resin material for a hose according to claim 1, further comprising a polyamide.

7. The resin material for a hose according to claim 1, wherein a content of the plasticizer is less than 3 mass % with respect to a total mass.

8. The resin material for a hose according to claim 1, wherein a content of the plasticizer is less than 0.1 mass % with respect to a total mass.

9. A hose comprising the resin material for a hose according to claim 1 being formed into a tubular form and used as a constituent member.

10. The hose according to claim 9 comprising the resin material for a hose as an inner surface layer or an outer surface layer, the resin material being formed into a tubular form.

11. The hose according to claim 10, wherein the hose connects components of an air conditioner installed in a vehicle and circulates a refrigerant.

* * * * *